（12）United States Patent
Sugio et al.

(10) Patent No.: US 10,843,112 B2
(45) Date of Patent: Nov. 24, 2020

(54) OIL SEPARATOR AND COMPRESSED AIR DRYING SYSTEM

(71) Applicant: NABTESCO AUTOMOTIVE CORPORATION, Tokyo (JP)

(72) Inventors: Takuya Sugio, Tokyo (JP); Hiroaki Kawanami, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 327 days.

(21) Appl. No.: 15/505,794

(22) PCT Filed: Aug. 28, 2015

(86) PCT No.: PCT/JP2015/074512
§ 371 (c)(1),
(2) Date: Feb. 22, 2017

(87) PCT Pub. No.: WO2016/031985
PCT Pub. Date: Mar. 3, 2016

(65) Prior Publication Data
US 2017/0246568 A1     Aug. 31, 2017

(30) Foreign Application Priority Data

Aug. 29, 2014   (JP) ................................. 2014-176075
Aug. 29, 2014   (JP) ................................. 2014-176076
Aug. 29, 2014   (JP) ................................. 2014-176077

(51) Int. Cl.
*B01D 49/00*     (2006.01)
*B01D 45/08*     (2006.01)
(Continued)

(52) U.S. Cl.
CPC ............ *B01D 45/08* (2013.01); *B60T 17/004* (2013.01); *F01N 3/0835* (2013.01); *F01P 3/20* (2013.01);
(Continued)

(58) Field of Classification Search
CPC ................ B01D 45/08; B01D 46/0086; B01D 46/0005; F01P 3/20; F01N 3/0835;
(Continued)

(56) References Cited

U.S. PATENT DOCUMENTS 5,141,490 A   *   8/1992   Fujii ....................... A61M 1/30
                                                                          210/195.2
5,490,976 A   *   2/1996   Rennie ...................... C22B 3/02
                                                                              423/1
(Continued)

FOREIGN PATENT DOCUMENTS

JP     H04-187957 A     7/1992
JP     H08-86221 A     4/1996
(Continued)

OTHER PUBLICATIONS

Notification of Reasons for Refusal Japanese Patent Application No. 2014-176075 dated Oct. 24, 2017 w/English translation.
(Continued)

*Primary Examiner* — Dung H Bui
(74) *Attorney, Agent, or Firm* — Pillsbury Winthrop Shaw Pittman, LLP (57) ABSTRACT

An oil separator includes a heating device that heats liquid stored in a liquid storage portion, a connecting pipe that connects the liquid storage portion to an external device that utilizes oil, an opening/closing device that selectively opens and closes the flow path of the connecting pipe, and a determination device that determines whether the liquid stored in the liquid storage portion should be delivered to the external device. The opening/closing device is configured to open the flow path of the connecting pipe when the determination device determines that the liquid accumulated in the liquid storage portion should be delivered to the external device.

9 Claims, 6 Drawing Sheets

(51) Int. Cl.

| | |
|---|---|
| *F04B 39/04* | (2006.01) |
| *F04B 39/02* | (2006.01) |
| *F04B 39/16* | (2006.01) |
| *B60T 17/00* | (2006.01) |
| *F01N 3/08* | (2006.01) |
| *F01P 3/20* | (2006.01) |
| *B01D 46/00* | (2006.01) |
| *F24F 3/16* | (2006.01) |
| *F24F 11/30* | (2018.01) |
| *F24F 11/39* | (2018.01) |
| *B60G 17/00* | (2006.01) |

(52) U.S. Cl.
CPC .......... *F04B 39/0284* (2013.01); *F04B 39/04* (2013.01); *F04B 39/16* (2013.01); *B01D 46/0005* (2013.01); *B01D 46/0086* (2013.01); *B60G 17/00* (2013.01); *B60G 2500/02* (2013.01); *F24F 3/1603* (2013.01); *F24F 11/30* (2018.01); *F24F 11/39* (2018.01)

(58) Field of Classification Search
CPC ........ B60T 17/004; F04B 39/04; F04B 39/16; F04B 39/0284; B60G 2500/02; B60G 17/00; F24F 11/39; F24F 3/1603; F24F 11/30
See application file for complete search history.

(56) References Cited

U.S. PATENT DOCUMENTS

| | | | | |
|---|---|---|---|---|
| 6,958,107 | B1* | 10/2005 | Clarke | ............... B01D 3/08 |
| | | | | 159/17.1 |
| 2002/0172602 | A1 | 11/2002 | Fukanuma et al. | |
| 2006/0222515 | A1* | 10/2006 | Delmotte | ............... F04B 25/00 |
| | | | | 417/228 |
| 2009/0282985 | A1* | 11/2009 | Whiteley | ........... B01D 17/0211 |
| | | | | 96/189 |
| 2010/0280430 | A1* | 11/2010 | Caleffi | ................. A61M 1/342 |
| | | | | 604/5.01 |
| 2011/0147290 | A1* | 6/2011 | Braunheim | .......... B01D 36/005 |
| | | | | 210/172.1 |
| 2012/0015391 | A1* | 1/2012 | Zhang | .................... C12M 41/46 |
| | | | | 435/29 |
| 2012/0312754 | A1* | 12/2012 | Eriksson | ................ B04C 11/00 |
| | | | | 210/739 |
| 2014/0166596 | A1* | 6/2014 | Anderson | ............. F02M 37/24 |
| | | | | 210/799 |
| 2015/0033685 | A1 | 2/2015 | Sugio et al. | |
| 2015/0360156 | A1* | 12/2015 | Swaminathan | ...... B01D 39/163 |
| | | | | 210/489 |

FOREIGN PATENT DOCUMENTS

| | | | |
|---|---|---|---|
| JP | 10296038 A | * | 11/1998 |
| JP | 2002-213350 A | | 7/2002 |
| JP | 2012-106155 A | | 6/2012 |
| JP | 2013-234632 A | | 11/2013 |
| JP | 2014-028361 A | | 2/2014 |
| JP | 2014-091059 A | | 5/2014 |

OTHER PUBLICATIONS

International Preliminary Report on Patentability and the Written Opinion of the International Searching Authority as issued in International Patent Application No. PCT/JP2015/074512, dated Feb. 28, 2017.

International Search Report as issued in International Patent Application No. PCT/JP2015/074512, dated Dec. 1, 2015.

* cited by examiner

OIL SEPARATOR AND COMPRESSED AIR DRYING SYSTEM

CROSS-REFERENCE TO RELATED APPLICATIONS

This application is the U.S. National Stage of PCT/JP2015/074512, filed Aug. 28, 2015, which in turn claims priority to Japanese Patent Application No. JP 2014-176075, filed Aug. 29, 2014, Japanese Patent Application No. JP 2014-176076, filed Aug. 29, 2014, and Japanese Patent Application No. JP 2014-176077, filed Aug. 29, 2014. The contents of these applications are incorporated herein by reference in their entireties.

TECHNICAL FIELD

The present invention relates to an oil separator and a compressed-air drying system.

BACKGROUND ART

Vehicles such as trucks, buses, and construction machines use compressed air delivered by a compressor to control systems such as brakes and suspensions. Compressed air delivered by a compressor contains water, which is contained in the atmosphere, and oil for lubricating the inside of the compressor. When the compressed air containing such water and oil enters the systems, it causes rust and swelling of rubber members, resulting in an operational defect of the systems. For this reason, a compressed-air drying system is provided downstream of the above-mentioned compressor to remove water and oil from the compressed air. The compressed-air drying system includes an air dryer that removes water and oil from compressed air by causing the compressed air to pass through a desiccant (see, for example, Patent Document 1).

The air dryer executes a loading mode operation for removing water and oil from compressed air by allowing the compressed air to pass through a desiccant and an unloading mode operation for regenerating the desiccant by ejecting water and oil trapped by the desiccant to the outside. The air ejected from the air dryer during the unloading mode operation contains water and oil. Thus, considering the burden on the environment, a compressed-air drying system has been proposed that has an oil separator in a passage for air ejected from the air dryer. This oil separator separates oil from the air ejected from the air dryer during the unloading mode operation and stores the separated oil.

The oil separator separates gas and liquid from each other by causing air containing water and oil to a strike impingement member. Such gas/liquid separation causes the air from which water and oil have been removed to be expelled to the outside and the water and oil that have been separated from the air to be stored in a liquid storage portion in the oil separator (for example, see Patent Document 2).

PRIOR ART DOCUMENTS

Patent Documents

Patent Document 1: Japanese Laid-Open Patent Publication No. 2012-106155
Patent Document 2: Japanese Laid-Open Patent Publication No. 2013-234632

SUMMARY OF THE INVENTION

Problems that the Invention is to Solve

In the oil separator described in the above-mentioned Patent Document 1, the liquid containing oil and water separated from air is stored in the liquid storage portion in the oil separator. Thus, when the amount of the stored liquid reaches the volume of the storage portion, the oil separator cannot store more liquid. Thus, the collected liquid needs to be periodically withdrawn from the oil separator. The number of times collected liquid is withdrawn is desired to be small. In this regard, an oil separator has been sought that reduces the number of times the separated liquid is recovered.

Accordingly, it is an objective of the present invention to provide an oil separator that reduces the number of times separated liquid is withdrawn.

Means for Solving the Problems

To achieve the foregoing objective and in accordance with one aspect of the present invention, an oil separator that includes a housing and an impingement member arranged in the housing is provided. The oil separator is configured to introduce air containing oil into the housing, cause the air to strike the impingement member to separate liquid containing the oil from the introduced air, and store the liquid in a liquid storage portion. The oil separator further includes a connecting pipe that connects the liquid storage portion to an external device that utilizes the oil, an opening/closing device that selectively opens and closes a flow path of the connecting pipe, and a determination device that determines whether the liquid stored in the liquid storage portion should be delivered to the external device. The opening/closing device is configured such that, when the determination device determines that the liquid stored in the liquid storage portion should be delivered to the external device, the opening/closing device opens the flow path of the connecting pipe.

In accordance with another aspect of the present invention, an oil separator that includes a housing and an impingement member arranged in the housing is provided. The oil separator introduces air containing oil into the housing and causes the air to strike the impingement member to separate liquid containing the oil from the introduced air and stores the liquid in a liquid storage portion. The oil separate is installed in a vehicle in which a diesel engine is mounted. The liquid storage portion includes an ejection port that is connected to a combustion unit provided in an exhaust purification device that traps particles contained in exhaust gas of the diesel engine. The liquid stored in the liquid storage portion is supplied to the combustion unit of the exhaust purification device.

In accordance with a further aspect of the present invention, a compressed-air drying system that traps water and oil contained in compressed air is provided. The system includes at least one of an air dryer and an oil mist separator and an oil separator. The air dryer is configured to trap water and oil contained in compressed air during a loading mode operation and to eject the trapped water and oil during an unloading mode operation. The oil mist separator is configured to trap oil contained in compressed air during a loading mode operation and to eject the trapped oil during an unloading mode operation. The oil separator is configured to store the ejected water and oil in a liquid storage portion.

The oil separator is arranged above the at least one of the air dryer and the oil mist separator in a vertical direction.

MODES FOR CARRYING OUT THE INVENTION

First Embodiment

An oil separator according to a first embodiment will now be described with reference to FIG. 1.

Figure 1:
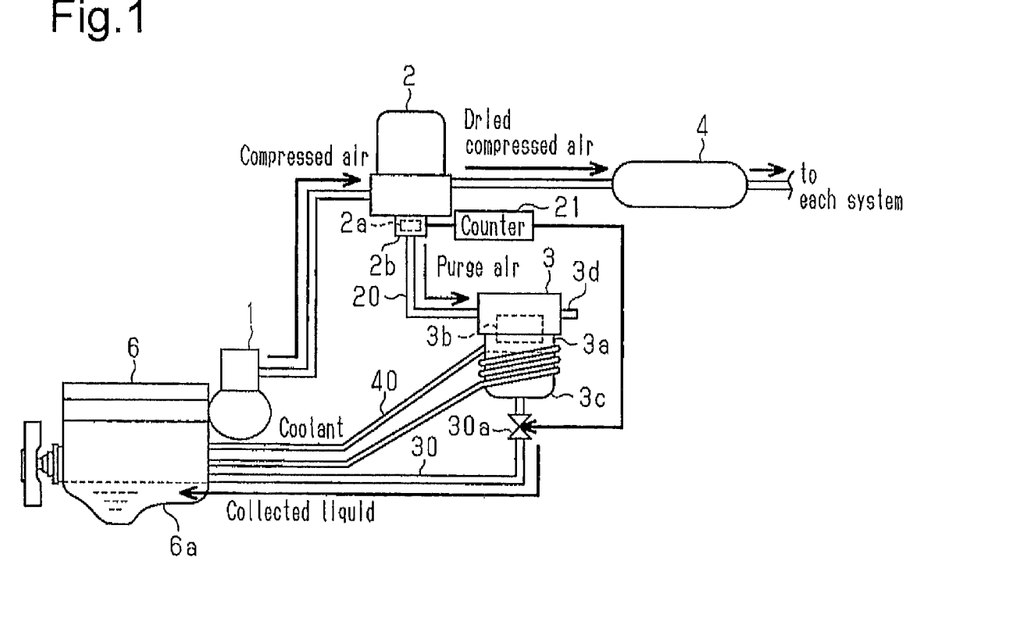
FIG. 1 is a block diagram illustrating an oil separator according to a first embodiment.

As shown in FIG. 1, a vehicle such as a truck, a bus, or a construction machine uses compressed air delivered from a compressor 1 to control systems such as brakes and suspensions. Thus, an air dryer 2, which removes oil and water from compressed air and delivers dried air, is provided downstream of the compressor 1 in an air system. The air dryer 2 incorporates a desiccant. The air dryer 2 executes a loading mode operation for removing water and oil from compressed air by allowing the compressed air to pass through the desiccant and an unloading mode operation for regenerating the desiccant by ejecting water and oil trapped by the desiccant to the outside. The air dryer 2 delivers, to a system tank 4, dry compressed air that has been dried through the loading mode operation. The system tank 4 supplies the compressed air to systems such as brakes and suspensions. When the pressure in the system tank 4 reaches a predetermined value, the governor (not shown) of the air dryer 2 is activated so that control air is introduced to the air dryer 2, which initiates the unloading mode operation. During the unloading mode operation, the control air opens an exhaust valve 2a. When the exhaust valve 2a of the air dryer 2 is opened, compressed air flows backward so that air that contains oil as well as water (purge air) is delivered from an ejection port 2b.

In consideration of the burden on the environment, an oil separator 3 is provided downstream of the compressor 1 in the air system. Specifically, the oil separator 3 is connected to the ejection port 2b of the air dryer 2 via an air dryer connection hose 20 to separate and store oil and water from the purge air ejected during regeneration of the desiccant in the air dryer 2.

The oil separator 3 is an impingement type oil separator that performs gas/liquid separation. The oil separator 3 has a housing 3a, in which an impingement member 3b is provided. Purge air containing oil and water is caused to strike the impingement member 3b. The impingement type oil separator 3 causes purge air containing oil and water to strike the impingement member 3b to separate the oil and water from the purge air, thereby ejecting clean air, from which oil and water have been separated, through an ejection port 3d. The flow path of the purge air from the introduction into the housing 3a to the impingement with the impingement member 3b is not particularly limited. For example, the flow path may include a portion for swirling the purge air. In this case, the oil separator 3 may be a cyclonic oil separator. The liquid that contains oil and water separated from the purge air will hereafter be referred to as collected liquid in some cases. The oil separator 3 has a liquid storage portion 3c, which stores the separated and collected liquid.

When the amount of the stored liquid reaches the volume of the liquid storage portion 3c, the oil separator 3 cannot store more liquid. In such a case, the oil separator 3 returns collected liquid, for example, to an internal combustion engine 6, which is an external device that utilizes oil. Furthermore, the oil separator 3 heats the collected liquid stored in the liquid storage portion 3c to vaporize water from the liquid, thereby reducing the ratio of water contained in the collected liquid. In order to sufficiently vaporize the water from the collected liquid, the oil separator 3 holds the collected liquid in the liquid storage portion 3c until it is determined that the delivery condition is satisfied. When it is determined that the delivery condition is satisfied, the oil separator 3 delivers the collected liquid to the external device from the liquid storage portion 3c.

The engine 6 has an oil pan 6a for storing lubricant. The lubricant stored in the oil pan 6a is circulated within the engine 6 and also circulated within the compressor 1.

The liquid storage portion 3c of the oil separator 3 is connected to the oil pan 6a of the engine 6 via a liquid supply hose 30. The collected liquid stored in the liquid storage portion 3c is supplied to the oil pan 6a of the engine 6. The liquid supply hose 30 corresponds to a connecting pipe. A control valve 30a is provided in the liquid supply hose 30. The control valve 30a is an opening/closing device that selectively opens and closes the passage. The collected liquid stored in the liquid storage portion 3c is heated by a coolant circuit 40, which functions as a heating device. The coolant circuit 40 is wound about the housing 3a of the oil separator 3 to transfer heat to the housing 3a. Coolant that has been heated by absorbing heat from the engine 6 flows through the coolant circuit 40. Heat is transferred to the housing 3a of the oil separator 3 from the heated coolant, so that the collected liquid in the liquid storage portion 3c is heated.

The oil separator 3 delivers collected liquid to the oil pan 6a of the engine 6 when the delivery condition is satisfied, that is, on the condition that the number of times purge air is introduced into the housing 3a has reached the number necessary to store a predetermined amount of collected liquid. That is, a counter 21 for counting the number of times purge air is ejected is installed at the ejection port 2b of the air dryer 2. In the present embodiment, the counter 21 functions as a determination device. The counter 21 measures the number of times purge air is introduced into the housing 3a by measuring the number of times the exhaust valve 2a is opened. Since approximate values of the amount of purge air ejected by a single opening operation and the ratio of oil and water contained in the purge air are known, the required number of times of introduction is determined based on the predetermined amount of collected liquid. The counter 21 causes the control valve 30a to open when the number of times purge air is ejected reaches the predetermined number. The counter 21 causes the control valve 30a to close after a lapse of a fixed time from its opening. The counter 21 keeps the control valve 30a closed until the number of times purge air is ejected reaches the predetermined number.

Operation of the oil separator configured as described above will now be described with reference to FIG. 1.

With reference to FIG. 1, the compressor 1 generates compressed air through operation of the engine 6 and delivers the compressed air to the air dryer 2. The air dryer 2 executes the loading mode operation to cause the compressed air from the compressor 1 to pass through the desiccant, thereby removing water and oil contained in the compressed air to dry the compressed air. The air dryer 2 then delivers the dry compressed air to the system tank 4. The system tank 4 supplies the compressed air to various systems. When the pressure in the system tank 4 reaches a predetermined value, the governor introduces control air to the air dryer 2, and the air dryer 2 executes the unloading mode operation for regenerating the desiccant. In the unloading mode operation, compressed air flows backward so that purge air that contains oil as well as water is delivered from the ejection port 2b. The purge air delivered through the ejection port 2b of the air dryer 2 is introduced to the oil separator 3 via the air dryer connection hose 20.

When receiving purge air, which contains oil and water, the oil separator 3 separates the oil and water from the purge air by causing the purge air to strike the impingement member 3b provided in the housing 3a. Clean air from which oil and water have been separated is ejected through the ejection port 3d. The oil and water separated from the purge air are stored as collected liquid in the liquid storage portion 3c. Since the liquid storage portion 3c is wrapped with and heated by the coolant circuit 40, the collected liquid stored in the liquid storage portion 3c is heated by the coolant circuit 40.

The counter 21 provided for the air dryer 2 counts the number of times purge air is ejected. When the counted number reaches a predetermined number, the counter 21 causes the control valve 30a to open. When the control valve 30a is opened, the liquid supply hose 30 is open, so that the collected liquid stored in the liquid storage portion 3c of the oil separator 3 is supplied into the oil pan 6a of the engine 6 through the liquid supply hose 30. The counter 21 causes the control valve 30a to close after a lapse of a fixed time from its opening.

As described above, the water in the collected liquid stored in the liquid storage portion 3c of the oil separator 3 is reduced by heating the collected liquid with the heated coolant, and the collected liquid, of which the water content has been reduced, is supplied to the oil pan 6a of the engine 6, which is an external device. Therefore, it is possible to reduce the number of times collected separated liquid in the oil separator 3 is withdrawn. Also, the counter 21 counts the number of times purge air is ejected, and causes the control valve 30a to open after the counted number reaches a predetermined number of times, so that the collected liquid is delivered to the oil pan 6a of the engine 6 after a predetermined amount of the collected liquid is stored.

The present embodiment as described above achieves the following advantages.

(1) By delivering the collected liquid stored in the liquid storage portion 3c of the oil separator 3 to the oil pan 6a of the engine 6, which utilizes oil, it is possible to reduce the number of times the separated liquid in the oil separator 3 is withdrawn. Also, until the delivery condition is satisfied, collected liquid is stored in the liquid storage portion 3c and heated to vaporize the water from the collected liquid. This permits collected liquid in which the ratio of water has been reduced to be delivered to the oil pan 6a of the engine 6.

(2) The counter 21 measures the number of times air containing oil is introduced into the housing 3a. When the measured number of times of introduction is greater than or equal to the number of times of introduction necessary for a predetermined amount of collected liquid to be stored in the liquid storage portion 3c, the control valve 30a opens the flow path of the liquid supply hose 30 and delivers the liquid to the oil pan 6a of the engine 6. This allows the delivery of collected liquid to be controlled based on the number of times of introduction of air containing oil.

(3) In the case of the oil separator 3 mounted on the vehicle equipped with the engine 6, it is only necessary to route the coolant circuit 40, which is provided in the engine 6, to the oil separator 3. Thus, no additional heating device is required, and the exhaust heat of the engine 6 is effectively utilized.

Second Embodiment

An oil separator according to a second embodiment will now be described with reference to FIG. 2. The oil separator of the present embodiment is different from the first embodiment in that the counter is replaced by a flow rate sensor. Differences from the first embodiment will mainly be discussed below.

Figure 2:
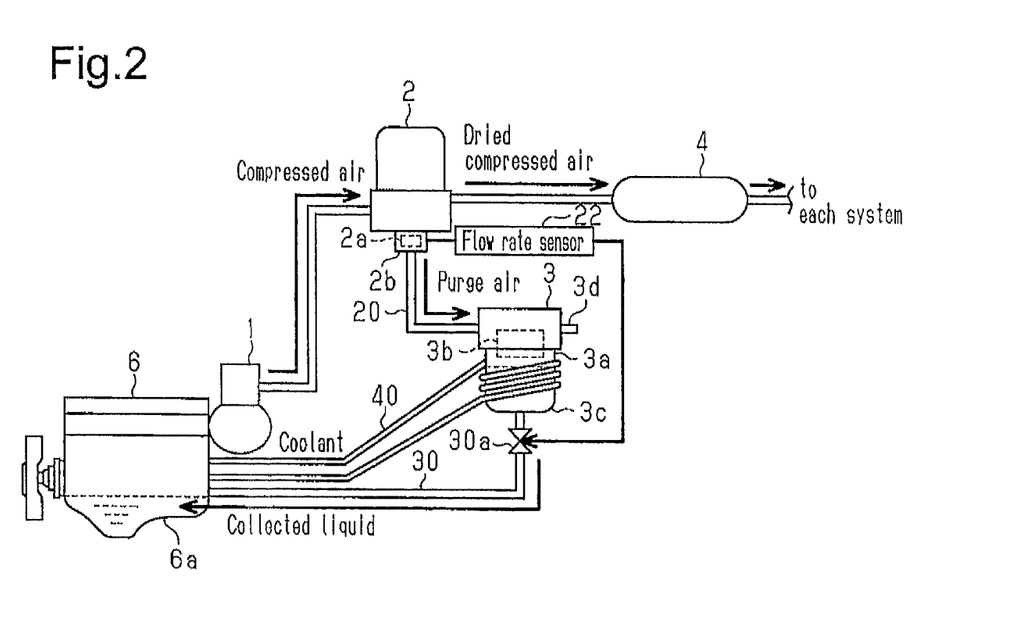
FIG. 2 is a block diagram illustrating an oil separator according to a second embodiment.

As shown in FIG. 2, a flow rate sensor 22, which is a measurement sensor, is arranged at the ejection port 2b of the air dryer 2. In the present embodiment, the flow rate sensor 22 functions as a determination device. The flow rate sensor 22 measures the amount of the collected liquid in the liquid storage portion 3c by measuring the amount (ejected amount) of purge air passing through the ejection port 2b based on the flow rate of the purge air at the ejection port 2b. The flow rate sensor 22 causes the control valve 30a to open when the measured ejected amount of the purge air increases and reaches a predetermined amount. Since an approximate value of the amount of oil and water contained in the ejected purge air is known, the predetermined amount of purge air is determined based on a specified amount of the liquid storage portion 3c. The flow rate sensor 22 causes the control valve 30a to close after a lapse of a fixed time from its opening. The flow rate sensor 22 keeps the control valve 30a closed until the measured ejected amount of the purge air reaches the predetermined amount.

Operation of the oil separator configured as described above will now be described with reference to FIG. 2.

As shown in FIG. 2, the flow rate sensor 22 provided for the air dryer 2 measures the ejected amount of purge air, and causes the control valve 30a to open when the ejected amount reaches the predetermined amount. When the control valve 30a is opened, the liquid supply hose 30 is open, so that the collected liquid stored in the liquid storage portion 3c of the oil separator 3 is supplied into the oil pan 6a of the engine 6 through the liquid supply hose 30. The flow rate sensor 22 causes the control valve 30a to close after a lapse of a fixed time from its opening.

As described above, the water in the collected liquid stored in the liquid storage portion 3c of the oil separator 3 is reduced by heating the collected liquid with the heated coolant, and the collected liquid, of which the water content has been reduced, is supplied to the oil pan 6a of the engine 6, which is an external device. Therefore, it is possible to reduce the number of times collected separated liquid in the oil separator 3 is withdrawn. Also, the flow rate sensor 22 measures the ejected amount of purge air, and causes the control valve 30a to open after the ejected amount reaches the predetermined amount, so that the collected liquid is delivered to the oil pan 6a of the engine 6 after a specified amount of the collected liquid is stored.

The present embodiment described above achieves the following advantage in addition to the advantages (1) and (3) of the first embodiment.

(4) By measuring the amount of purge air containing oil ejected from the air dryer 2 with the flow rate sensor 22, the amount of the collected liquid in the liquid storage portion 3c is measured. When the measured amount of the collected liquid is greater than or equal to the predetermined amount, the control valve 30a opens the flow path of the liquid supply hose 30 to deliver the collected liquid to the oil pan 6a of the engine 6. This allows the delivery of collected liquid to be controlled based on the ejected amount of purge air that contains oil.

Third Embodiment

An oil separator according to a third embodiment will now be described with reference to FIG. 3. The oil separator of the present embodiment is different from the first embodiment in that the amount of collected liquid itself stored in the liquid storage portion 3c of the oil separator is used as the delivery condition. Differences from the first embodiment will mainly be discussed below.

Figure 3:
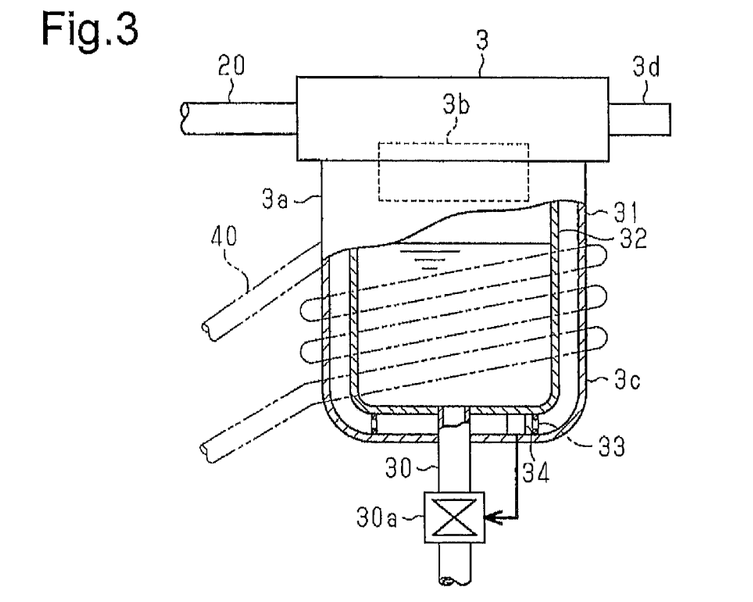
FIG. 3 is a block diagram illustrating the internal structure of an oil separator according to a third embodiment.

As shown, in FIG. 3, the liquid storage portion 3c of the oil separator 3 has a double structure including an outer container 31 and an inner container 32. The inner container 32 is arranged inside the outer container 31. Collected liquid is stored in the inner container 32. The inner container 32 is supported by the outer container 31 with a spring 33. On the inner bottom of the outer container 31, a weight sensor 34, which is a measurement sensor, is installed. In the present embodiment, the weight sensor 34 functions as a determination device. The weight sensor 34 measures the amount of the collected liquid stored in the liquid storage portion 3c by measuring the weight of the collected liquid stored in the liquid storage portion 3c. When a predetermined amount of collected liquid is stored, the inner container 32 is lowered toward the bottom against the urging force of the spring 33, and the weight sensor 34 detects that the predetermined amount of collected liquid has been stored. The weight sensor 34 causes the control valve 30a to open when the measured weight of collected liquid reaches the predetermined amount. The weight sensor 34 causes the control valve 30a to close after a lapse of a fixed time from its opening. The flow rate sensor 22 keeps the control valve 30a closed until the measured weight of the collected liquid reaches the predetermined amount.

Operation of the oil separator configured as described above will now be described with reference to FIG. 2.

As shown in FIG. 2, the weight sensor 34 provided in the oil separator 3 measures the weight of the collected liquid stored in the liquid storage portion 3c. When the weight reaches the predetermined amount, the weight sensor 34 causes the control valve 30a to open. When the control valve 30a is opened, the liquid supply hose 30 is open, so that the collected liquid stored in the liquid storage portion 3c of the oil separator 3 is supplied into the oil pan 6a of the engine 6 through the liquid supply hose 30. The weight sensor 34 causes the control valve 30a to close after a lapse of a fixed time from its opening.

As described above, the water in the collected liquid stored in the liquid storage portion 3c of the oil separator 3 is reduced by heating the collected liquid with the heated coolant, and the collected liquid, of which the water content has been reduced, is supplied to the oil pan 6a of the engine 6, which is an external device. Therefore, it is possible to reduce the number of times collected separated liquid in the oil separator 3 is withdrawn. Also, the weight sensor 34 measures the weight of the collected liquid and causes the control valve 30a to open after the weight reaches the predetermined value, so that the collected liquid is delivered to the oil pan 6a of the engine 6 after the predetermined amount of the collected liquid is stored.

The present embodiment described above achieves the following advantage in addition to the advantages (1) and (3) of the first embodiment.

(5) The weight sensor 34 measures the amount of the collected liquid stored in the liquid storage portion 3c by measuring the weight of the collected liquid stored in the liquid storage portion 3c. When the measured amount of the collected liquid is greater than or equal to the predetermined amount, the control valve 30a opens the flow path of the liquid supply hose 30 to deliver the collected liquid to the oil pan 6a of the engine 6. This allows the delivery of collected liquid to be controlled based on the amount of the collected liquid stored in the liquid storage portion 3c.

Fourth Embodiment

An oil separator according to a fourth embodiment will now be described with reference to FIG. 4. The oil separator of the present embodiment is different from the first embodiment in that the ratio of water (water ratio) contained in the collected liquid stored in the liquid storage portion 3c of the oil separator is used as the delivery condition. Differences from the first embodiment will mainly be discussed below.

Figure 4:
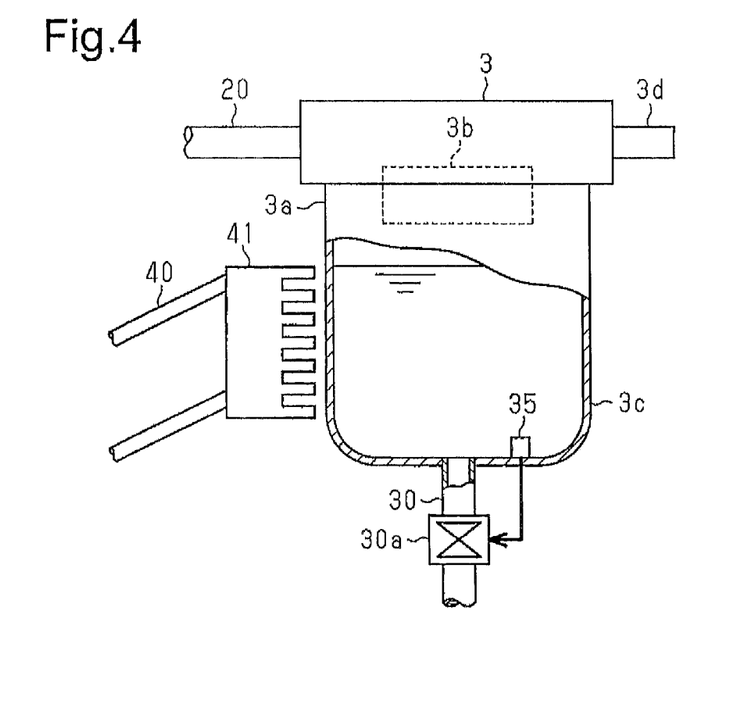
FIG. 4 is a block diagram illustrating a heating device of an oil separator according to a fourth embodiment.

As shown in FIG. 4, a water sensor 35 for measuring the ratio of water in the collected liquid is installed in the liquid storage portion 3c of the oil separator 3. In the present embodiment, the water sensor 35 functions as a determination device. The water sensor 35 causes the control valve 30a to open when the measured ratio of water has decreased to a predetermined value. The water sensor 35 causes the control valve 30a to close after a lapse of a fixed time from its opening. The water sensor 35 keeps the control valve 30a closed until the measured ratio of water becomes the predetermined value.

The coolant circuit 40 is not wound around the liquid storage portion 3c. A fin member 41 is arranged at a position opposed to a side of the liquid storage portion 3c. When the heated coolant passes through the fin member 41, heat is radiated from the fin portion of the fin member 41, and the radiated heat heats the liquid storage portion 3c.

Operation of the oil separator configured as described above will now be described with reference to FIG. 4.

As shown in FIG. 4, the water sensor 35 provided in the oil separator 3 measures the ratio of water in the collected liquid stored in the liquid storage portion 3c. When the ratio of water becomes the predetermined value, the water sensor 35 causes the control valve 30a to open. When the control valve 30a is opened, the liquid supply hose 30 is open, so that the collected liquid stored in the liquid storage portion 3c of the oil separator 3 is supplied into the oil pan 6a of the engine 6 through the liquid supply hose 30. The water sensor 35 causes the control valve 30a to close after a lapse of a fixed time from its opening.

As described above, the water in the collected liquid stored in the liquid storage portion 3c of the oil separator 3 is reduced to the amount corresponding to the predetermined ratio of water by heating the collected liquid with the heated coolant, and the collected liquid, in which the water has been reduced, is supplied to the oil pan 6a of the engine 6, which is an external device. Therefore, it is possible to reduce the number of times collected separated liquid in the oil separator 3 is withdrawn. Also, the water sensor 35 measures the ratio of water in the collected liquid, and causes the control valve 30a to open after the ratio of water becomes the predetermined value, so that the collected liquid is delivered to the oil pan 6a of the engine 6 after the amount water in the collected liquid is decreased to the amount corresponding to the predetermined ratio of water.

The present embodiment described above achieves the following advantage in addition to the advantages (1) and (3) of the first embodiment.

(6) The water sensor 35 measures the ratio of water contained in the collected liquid stored in the liquid storage portion 3c, When the ratio of water contained in the collected liquid is less than or equal to the predetermined value, the control valve 30a opens the flow path of the liquid supply hose 30 and delivers the liquid to the oil pan 6a of the engine 6. This allows the delivery of collected liquid to be controlled based on the ratio of water contained in the collected liquid stored in the liquid storage portion 3c.

The above described first to fourth embodiments may be modified as follows.

In the first embodiment, the counter 21 measures the number of times the exhaust valve 2a is opened. However, the number of times the purge air passes through the ejection port 2b may be measured.

The third embodiment may be modified such that the weight sensor 34 measures the weight of the collected liquid stored in the liquid storage portion 3c, and the control valve 30a is opened when the measured weight reaches a predetermined value.

In the third embodiment, the weight of the collected liquid stored in the liquid storage portion 3c is measured. However, a sensor may be provided that detects whether the volume of the collected liquid stored in the liquid storage portion 3c has reached a predetermined value.

In the first to fourth embodiments, the respective sensors cause the control valve 30a to close after a lapse of a fixed time from its opening. However, the control valve 30a may be configured to close after a lapse of a fixed time from its opening.

In the first to third embodiments, the coolant circuit 40 is wound about the liquid storage portion 3c. However, as in the fourth embodiment, a fin member 41 may be provided. The fin member 41 may be provided after the coolant circuit 40 is wound around the liquid storage portion 3c.

In the fourth embodiment, the fin member 41 is provided. However, as in the first to third embodiments, the coolant circuit 40 may be wound about the liquid storage portion 3c. The fin member 41 may be provided after the coolant circuit 40 is wound around the liquid storage portion 3c.

Figure 5:
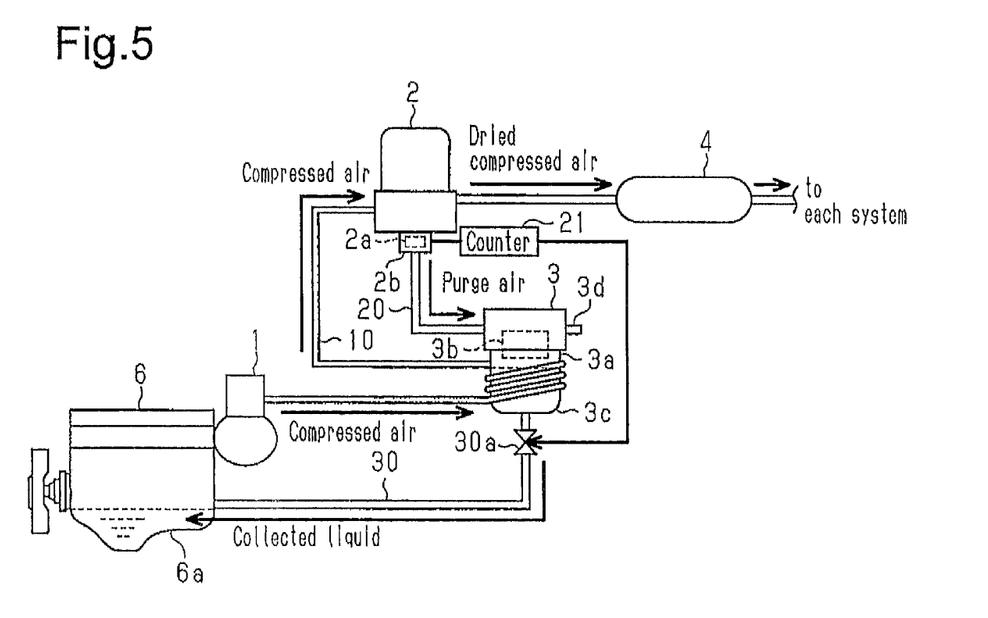
FIG. 5 is a block diagram illustrating an oil separator according to a modification.

In the first to fourth embodiments, the coolant circuit 40 of the engine 6 is employed as a heating device. However, as shown in FIG. 5, instead of the coolant circuit 40, a compressed air supply hose 10, or a supply pipe through which compressed air generated by the compressor 1 passes, may be employed as a heating device. In the case of the oil separator 3 mounted on a vehicle equipped with the compressor 1, it only requires that the compressed air supply hose 10, through which compressed air generated by the compressor 1 passes, be routed into the oil separator 3. Thus, no additional heating device is required, and the heat of the compressed air is effectively utilized.

In the first to fourth embodiments, in addition to or instead of the coolant circuit 40, an additional heating device such as an electric heater may be provided in the liquid storage portion 3c.

Fifth Embodiment

An oil separator according to a fifth embodiment will now be described with reference to FIG. 6.

Figure 6:
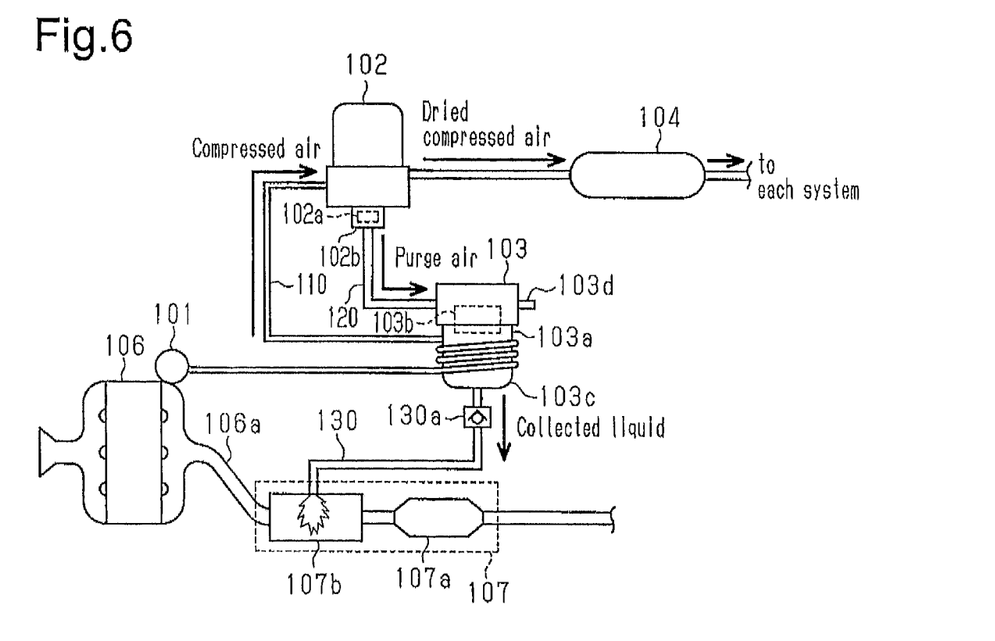
FIG. 6 is a block diagram illustrating an oil separator according to a fifth embodiment.

As shown in FIG. 6, a vehicle such as a truck, a bus, or a construction machine uses compressed air delivered from a compressor 101 to control systems such as brakes and suspensions. Thus, an air dryer 102, which removes oil and water from compressed air and delivers dried air, is provided downstream of the compressor 101 in an air system. The air dryer 102 incorporates a desiccant. The air dryer 102 executes a loading mode operation for removing water and oil from compressed air by allowing the compressed air to pass through the desiccant and an unloading mode operation for regenerating the desiccant by ejecting water and oil trapped by the desiccant to the outside. The air dryer 102 delivers, to a system tank 104, dry compressed air that has been dried through the loading mode operation. The system tank 104 supplies the compressed air to systems such as brakes and suspensions. When the pressure in the system tank 104 reaches a predetermined value, the governor (not shown) of the air dryer 102 is activated so that control air is introduced to the air dryer 2, which initiates the unloading mode operation. During the unloading mode operation, the control air opens an exhaust valve 102a. When the exhaust valve 102a of the air dryer 102 is opened, compressed air flows backward so that air that contains oil as well as water (purge air) is delivered from an ejection port 102b.

In consideration of the burden on the environment, an oil separator 203 is provided downstream of the compressor 101 in the air system. Specifically, the oil separator 103 is connected to the ejection port 102b of the air dryer 102 via an air dryer connection hose 120 to separate and store oil and water from the purge air ejected during regeneration of the desiccant in the air dryer 102.

The oil separator 103 is an impingement type oil separator that performs gas/liquid separation. The oil separator 103 has a housing 103a, in which an impingement member 103b is provided. Purge air containing oil and water is caused to strike the impingement member 103b. The impingement type oil separator 103 causes purge air containing oil and water to strike the impingement member 103b to separate the oil and water from the purge air, thereby ejecting clean air, from which oil and water have been separated, through an ejection port 103d. The flow path of the purge air from the introduction into the housing 103a to the impingement with the impingement member 103b is not particularly limited. For example, the flow path may include a portion for swirling the purge air. In this case, the oil separator 103 may be a cyclonic oil separator. The liquid that contains oil and water separated from the purge air will hereafter be referred to as collected liquid in some cases. The oil separator 103 has a liquid storage portion 103c, which stores the separated and collected liquid.

When the amount of the stored liquid reaches the volume of the liquid storage portion 103c, the oil separator 103 cannot store more liquid. In such a case, the oil separator 103 returns the collected liquid to an external device that utilizes oil. Furthermore, the oil separator 103 heats the collected liquid stored in the liquid storage portion 103c to vaporize water from the liquid, thereby reducing the ratio of water contained in the collected liquid. The oil separator 103 delivers the collected liquid to the external device from the liquid storage portion 103c.

An engine 106 is a diesel engine. Therefore, an exhaust pipe 106a of the engine 106 is provided with an exhaust purification device 107 that traps particles contained in exhaust gas. The exhaust purification device 107 includes a diesel particulate filter 107a for trapping particulate matter and a combustion unit 107b for raising the temperature of exhaust. The combustion unit 107b raises the temperature of exhaust gas by burning fuel. The exhaust gas, of which the temperature has been raised in the combustion unit 107b, oxidizes particulate matter and removes it from the diesel particulate filter 107a.

The liquid storage portion 103c of the oil separator 103 is connected to the combustion unit 107b of the exhaust purification device 107 via a liquid supply hose 130. The collected liquid stored in the liquid storage portion 103c is supplied to the combustion unit 107b of the exhaust purification device 107. The combustion unit 107b burs the supplied liquid as fuel to increase the temperature of exhaust gas. The liquid supply hose 130 is provided with a check valve 130a for preventing backflow. The collected liquid stored in the liquid storage portion 103c is heated by a compressed air supply hose 110, which functions as a heating device. The compressed air supply hose 110 is wound about the housing 103a of the oil separator 103 and is configured to transfer heat to the housing 103a. Air that has been compressed by the compressor 101 passes through the compressed air supply hose 110. Heat is transferred to the housing 103a of the oil separator 103 from the compressed air, which has been heated through compression, so that the collected liquid in the liquid storage portion 103c is heated. This promotes vaporization of the water contained in the collected liquid.

Operation of the oil separator configured as described above will now be described with reference to FIG. 6.

With reference to FIG. 6, the compressor 101 generates compressed air through operation of the engine 106 and delivers the compressed air to the air dryer 102. The air dryer 102 executes the loading mode operation to cause the compressed air from the compressor 101 to pass through the desiccant, thereby removing water and oil contained in the compressed air to dry the compressed air. The air dryer 2 then delivers the dry compressed air to the system tank 104. The system tank 104 supplies the compressed air to various systems. When the pressure in the system tank 104 reaches a predetermined value, the governor introduces control air to the air dryer 102, and the air dryer 2 executes the unloading mode operation for regenerating the desiccant. In the unloading mode operation, compressed air flows backward so that purge air that contains oil as well as water is delivered from the ejection port 102b. The purge air delivered through the ejection port 102b of the air dryer 102 is introduced to the oil separator 103 via the air dryer connection hose 120.

When receiving purge air, which contains oil and water, the oil separator 103 separates the oil and water from the purge air by causing the purge air to strike the impingement member 103b provided in the housing 103a. Clean air from which oil and water have been separated is ejected through the ejection port 103d. The oil and water separated from the purge air are stored as collected liquid in the liquid storage portion 103c. Since the liquid storage portion 103c is wrapped with and heated by the compressed air supply hose 110, the collected liquid stored in the liquid storage portion 103c is heated by the compressed air supply hose 110.

The collected liquid stored in the liquid storage portion 103c of the oil separator 103 is supplied to the combustion unit 107b of the exhaust purification device 107 via the liquid supply hose 130. The combustion unit 107b burns the collected liquid as fuel to increase the temperature of exhaust gas.

As described above, the collected liquid stored in the liquid storage portion 103c of the oil separator 103 is heated with compressed air to reduce the water in the collected liquid. The collected liquid is then supplied to the combustion unit 107b of the exhaust purification device 107, which is an external device. This reduces the number of times the collected liquid that has been separated from the purge air and stored by the oil separator 103 is withdrawn.

The fifth embodiment as described above achieves the following advantages.

(7) By delivering the collected liquid stored in the liquid storage portion 103c of the oil separator 103 to the combustion unit 107b of the exhaust purification device 107, which utilizes oil, it is possible to reduce the number of times the collected liquid that has been separated from the purge air and stored by the oil separator is withdrawn. Also, the configuration reduces the amount of fuel used by the combustion unit 107b of the exhaust purification device 107, which improves the fuel economy.

(8) The collected liquid stored in the liquid storage portion 103c of the oil separator 103 is heated to vaporize water in the collected liquid. This allows the collected liquid, in which the ratio of water has been reduced, to be supplied to the combustion unit 107b of the exhaust purification device 107.

(9) In the case of the oil separator 103 mounted on a vehicle equipped with the compressor 101, it only requires that the compressed air supply hose 110, through which compressed air generated by the compressor 101 passes, be routed into the oil separator 103. Thus, no additional heating device is required, and the heat of the compressed air is effectively utilized.

The fifth embodiment may be modified as follows.

In the fifth embodiment, the collected liquid in the liquid storage portion 103c is heated with compressed air. However, the collected liquid in the liquid storage portion 103c may be heated with coolant that has been heated through cooling the engine 106.

In the fifth embodiment, a heating device such as an electric heater may be provided in the liquid storage portion 103c.

Figure 7:
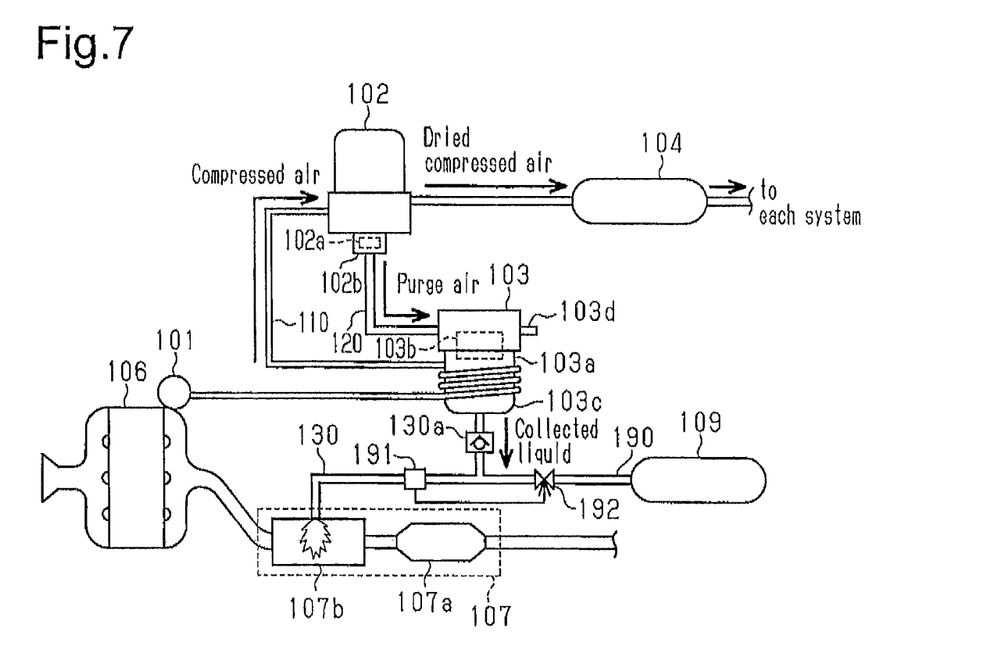
FIG. 7 is a block diagram illustrating an oil separator according to a modification.

As shown in FIG. 7, the fuel for the combustion unit 107b of the exhaust purification device 107 is not limited to the collected liquid stored in the liquid storage portion 103c. However, fuel from a fuel tank may be supplied and mixed with the collected liquid. That is, a fuel supply hose 190 connected to the fuel tank 109 is connected to the liquid supply hose 130. Further, a detection sensor 191 for detecting the state of mixed fuel may be provided, and the supply amount of the fuel from the fuel tank 109 may be controlled by a control valve 192 based on the detected state of the fuel. For example, a water sensor may be employed as the detection sensor 191. In this case, the ratio of oil contained in the collected liquid supplied to the combustion unit 107b of the exhaust purification device 107 can be increased by mixing the collected liquid and the oil, which is fuel. This improves the combustion efficiency.

Sixth Embodiment

Since an air dryer is often installed together with various devices, the installation space for an oil separator is limited around the air dryer. In addition, since an oil separator is often retrofitted to remove oil contained in the gas discharged by the air dryer, the installation space for the oil separator is not taken into consideration. In the compressed-air drying systems described in Patent Documents 1 and 2, the installation positions of the air dryer and the oil separator are not discussed. Thus, a compressed-air drying system is desired in which an air dryer and an oil separator are located at optimal positions.

The present embodiment provides a compressed-air drying system in which an air dryer and an oil separator are located at optimal positions.

A compressed-air drying system according to the sixth embodiment will now be described with reference to FIGS. 8 to 10. In the sixth embodiment, the compressed-air drying system is employed in a tractor.

Figure 8:
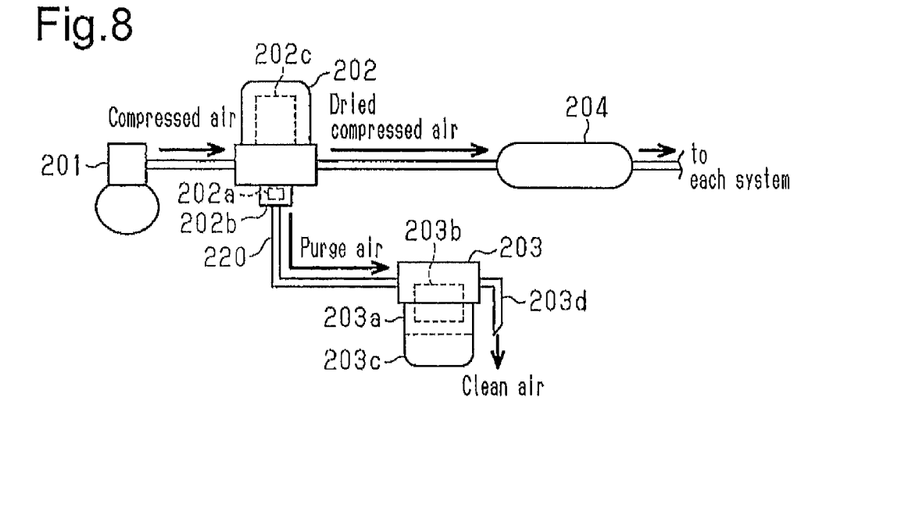
FIG. 8 is a block diagram schematically illustrating a compressed-air drying system according to a sixth embodiment.

As shown in FIG. 8, a tractor that tows a trailer uses compressed air delivered from a compressor 201 to control systems such as brakes and suspensions. A compressed-air drying system for removing oil and water from compressed air is provided downstream of the compressor 201. The compressed-air drying system includes an air dryer 202, which dries compressed air by removing oil and water from the compressed air. The air dryer 202 incorporates a desiccant 202c. The air dryer 202 executes a loading mode operation for removing water and oil from compressed air by allowing the compressed air to pass through the desiccant 202c and an unloading mode operation for regenerating the desiccant 202c by ejecting water and oil trapped by the desiccant 202c to the outside. The air dryer 202 delivers, to a system tank 204, dry compressed air that has been dried through the loading mode operation. The system tank 204 supplies the compressed air to systems such as brakes and suspensions. When the pressure in the system tank 204 reaches a predetermined value, the unloading mode operation is executed. During the unloading mode operation, an exhaust valve 202a of the air dryer 202 is opened. When the exhaust valve of the air dryer 202 is opened, compressed air flows backward so that air that contains oil as well as water (purge air) is delivered from an ejection port 202b. In other words, the air dryer 202 ejects the trapped water and oil with the backflow of compressed air.

In consideration of the burden on the environment, the compressed-air drying system includes an oil separator 203, which is provided at the ejection port 202b of the air dryer 202. The oil separator 203 is connected to the ejection port 202b of the air dryer 202 via an air dryer connection hose 220 to separate and store oil and water from the purge air ejected during regeneration of the desiccant 202c in the air dryer 202.

The oil separator 203 is an impingement type oil separator that performs gas/liquid separation. The oil separator 203 has a housing 203a, in which an impingement member 203b is provided. Purge air containing oil and water is caused to strike the impingement member 203b. The impingement type oil separator 203 causes purge air containing oil and water to strike the impingement member 203b to separate the oil and water from the purge air, thereby ejecting clean air, from which oil and water have been separated, through an ejection port 203d. The flow path of the purge air from the introduction into the housing 203a to the impingement with the impingement member 203b is not particularly limited. For example, the flow path may include a portion for swirling the purge air. In this case, the oil separator 203 may be a cyclonic oil separator. The liquid that contains oil and water separated from the purge air will hereafter be referred to as collected liquid in some cases. The oil separator 203 has a liquid storage portion 203θ, which stores the separated and collected liquid.

Figure 9:
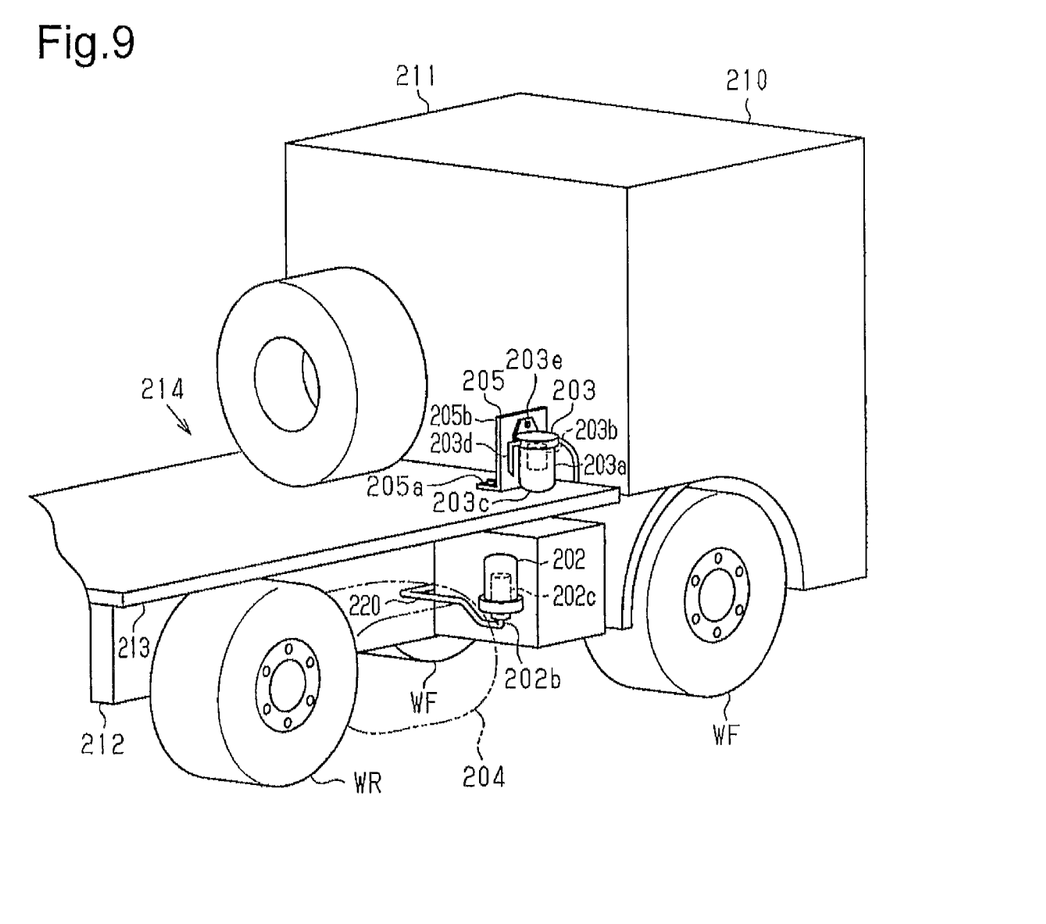
FIG. 9 is a perspective view illustrating the positions in a tractor of the air dryer and the oil separator of the compressed-air drying system according to the sixth embodiment.
Figure 10:
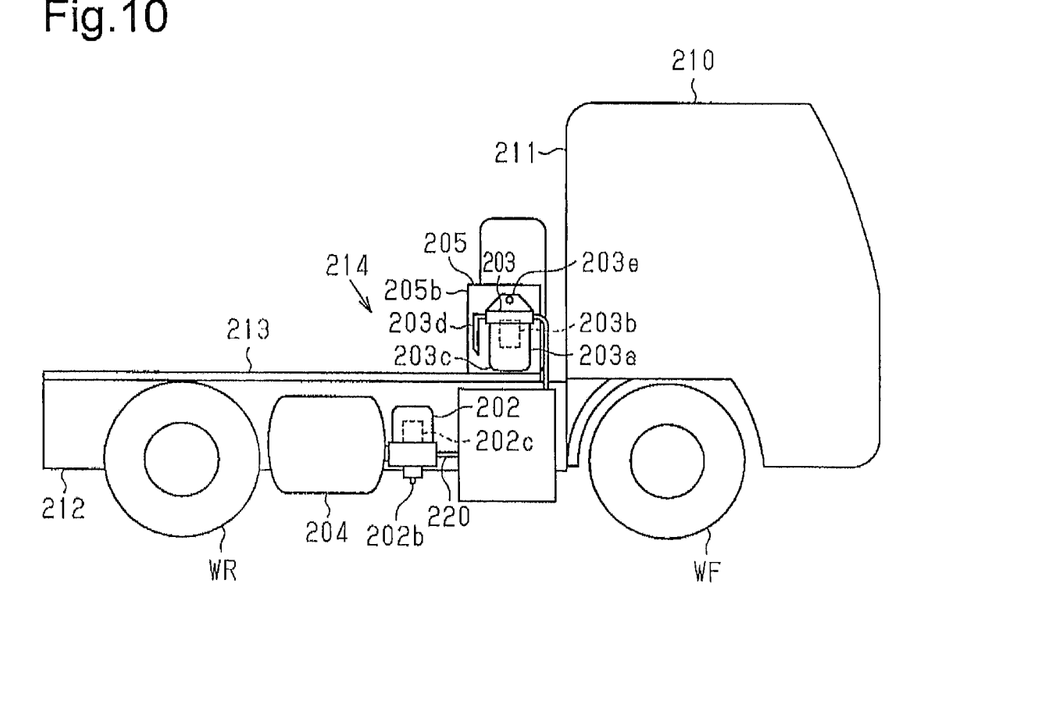
FIG. 10 is a side view illustrating the positions in the tractor of the air dryer and the oil separator of the compressed-air drying system shown in FIG. 9.

As shown in FIGS. 9 and 10, the tractor 210 is capable of traveling on its own and thus has front wheels WF and rear wheels WR. Above the front wheels WF, a cab 211 is provided, which includes a driver's seat and a passenger seat. A loading platform 214 is provided on side frames 212 at a position from behind the cab 211 to above the rear wheels WR. A top board 213, on which articles are loaded, is placed on the loading platform 214.

The oil separator 203 of the compressed-air drying system is located above the air dryer 202 of the compressed air-drying system in the vertical direction. That is, the air dryer 202 is installed below the top board 213, and the oil separator 203 is installed above the top board 213. The system tank 204 is fixed below the top board 213. The air dryer 202 is fixed to the system tank 204.

The oil separator 203 is fixed to the top board 213 with a support member 205. The support member 205 is an L-shaped plate. The support member 205 has a fixed portion 205a, which faces the top board 213 and is fixed to the top board 213 with bolts. The oil separator 203 has a housing 203a and an attachment portion 203e for fixation. The attachment portion 203e is integrated with the housing 203a. The support member 205 has a support portion 205b, which extends upward from the top board 213. The attachment portion 203e of the oil separator 203 is fixed to the support portion 205b with bolts. Since there is almost no available space around the air dryer 202, installation of the oil separator 203 is facilitated by arranging it above of the top board 213.

Operation of the compressed-air drying system configured as described above will now be described with reference to FIGS. 8 to 10.

With reference to FIGS. 8 to 10, the compressor 201 generates compressed air through operation of the engine and delivers the compressed air to the air dryer 202. The air dryer 202 executes the loading mode operation to cause the compressed air from the compressor 201 to pass through the desiccant 202c, thereby removing water and oil contained in the compressed air to dry the compressed air. The air dryer 202 then delivers the dry compressed air to the system tank 204. The system tank 204 supplies the compressed air to various systems. When the pressure in the system tank 204 reaches a predetermined value, the air dryer 202 executes the unloading mode operation to regenerate the desiccant 202c. In the unloading mode operation, compressed air flows backward so that purge air that contains oil as well as water is delivered from the ejection port 202b. The purge air delivered through the ejection port 202b of the air dryer 202 is introduced to the oil separator 203 via the air dryer connection hose 220. The purge air is delivered to the oil separator 203 located above the air dryer 202 in the vertical direction by the pressure of the compressed air.

When receiving purge air, which contains oil and water, the oil separator 203 separates the oil and water from the purge air by causing the purge air to strike the impingement member 203b provided in the housing 203a. Clean air from which oil and water have been separated is ejected through the ejection port 203d. The oil and water separated from the purge air are stored as collected liquid in the liquid storage portion 203c.

As described above, since the oil separator 203 is easily installed above the air dryer 202 in the vertical direction, the air dryer 202 and the oil separator 203 can be installed at optimal positions.

The sixth embodiment as described above achieves the following advantages.

(10) The area surrounding the air dryer 202 is occupied by the existing devices and provides thus no installation space. Thus, arranging the oil separator 203 above the air dryer 202 in the vertical direction, where a relatively large installation space exists, facilitates the installation. This also allows the air dryer 202 and the oil separator 203 to be located at optimal positions.

(11) The oil separator 203 is installed on the upper side of the top board 213, on which articles are loaded. This ensures that the installation space for the oil separator 203 be provided, and thus facilitates the installation of the oil separator 203. In addition, since the upper side of the top board 213 is a position where the operator does not need to bend over when withdrawing the collected liquid from the oil separator 203. This facilitates the withdrawing operation.

(12) Since the oil separator 203 is fixed to the top board 213 via the support member 205, the oil separator 203 is reliably installed on the top board 213.

The sixth embodiment may be modified as follows.

Figure 11:
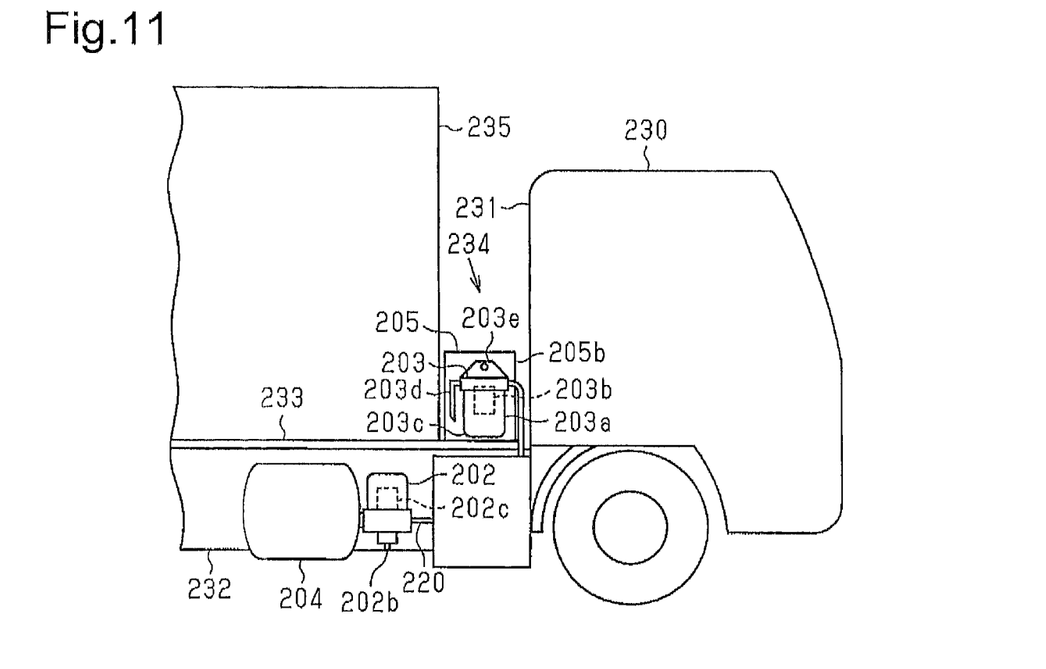
FIG. 11 is a side view illustrating the positions in a truck of an air dryer and an oil separator of a compressed-air drying system according to a modification.

In the sixth embodiment, the compressed-air drying system is employed in the tractor 210, which tows a trailer. However, the compressed-air drying system may be employed in vehicles such as trucks, buses, and construction machines. For example, as shown in FIG. 11, the oil separator 203 may be installed between a cab 231 of a track 230 and a body 235 serving as a cargo space. A loading platform 234 is provided above side frames 232. A top board 233 is placed on the loading platform 234. The oil separator 203 is fixed to the top board 233 with, a support member 205 fixed to the top board 233.

In the sixth embodiment, the present invention is applied to vehicles having top boards 213, 233. However, even in a vehicle having no top board, the oil separator 203 may be installed to be located above the air dryer 202 in the vertical direction.

In the sixth embodiment, an oil mist separator may be provided between the compressor 201 and the air dryer 202. During the loading mode operation, the oil mist separator traps oil contained as oil mist in compressed air introduced from the compressor 201. During the unloading mode operation, the oil mist separator ejects collected liquid containing the trapped oil to the oil separator 203. The oil in the ejected oil mist is stored in a liquid storage portion 203c of the oil separator 203. If an oil mist separator is provided between the compressor 201 and the air dryer 202, the air dryer 202 does not necessarily need to be connected to the oil separator 203.

The invention claimed is:

1. A compressed-air drying system comprising:
   an air dryer comprising a desiccant, a supplying line, and an ejecting line, the air dryer configured to allow compressed air supplied from a compressor to pass through the desiccant, to trap water and oil contained in the compressed air, and to supply dried compressed air to the supplying line during a loading mode operation, and to regenerate the desiccant by ejecting purge air containing the trapped water and oil through the ejecting line during an unloading mode operation; and
   an oil separator, the oil separator connected to the ejecting line, comprising:
      a housing;
      an impingement member arranged in the housing,
      wherein the oil separator is configured to introduce the purge air ejected from the air dryer into the housing, to cause the purge air to strike the impingement member to separate liquid containing the oil from the introduced purge air, and to store the liquid in a liquid storage portion;
      a connecting pipe that connects the liquid storage portion to an external device that utilizes the oil;
      an opening/closing device that selectively opens and closes a flow path of the connecting pipe; and
      a determination device that includes a sensor that measures a number of times the purge air is introduced into the housing, the sensor configured to determine whether the liquid stored in the liquid storage portion should be delivered to the external device,
   wherein, when the measured number of times of introduction of the purge air into the housing is greater than or equal to a number of times of introduction necessary for a predetermined amount of the liquid to be stored, the determination device determines that the liquid stored in the liquid storage portion should be delivered to the external device, and
   wherein the opening/closing device is configured such that, when the determination device determines that the liquid stored in the liquid storage portion should be delivered to the external device, the opening/closing device opens the flow path of the connecting pipe.

2. The compressed-air drying system according to claim 1, wherein the determination device includes a measurement sensor that measures an amount of the liquid in the liquid storage portion, and
   wherein, when the measured amount of the liquid is greater than or equal to a predetermined amount, the determination device determines that the liquid stored in the liquid storage portion should be delivered to the external device.

3. The compressed-air drying system according to claim 1, wherein the determination device includes a water sensor that measures a ratio of water contained in the liquid in the liquid storage portion, and
   wherein, when the measured ratio of water is less than or equal to a predetermined value, the determination device determines that the liquid stored in the liquid storage portion should be delivered to the external device.

4. The compressed-air drying system according to claim 1, further comprising a heating device that heats the liquid stored in the liquid storage portion.

5. The compressed-air drying system according to claim 4, wherein the heating device includes a circuit for coolant that cools an internal combustion engine, and
   wherein the circuit is routed via the housing to heat the liquid storage portion.

6. The compressed-air drying system according to claim 4, wherein the heating device includes a supply pipe through which the compressed air passes, and
   wherein the supply pipe is routed via the housing to heat the liquid storage portion.

7. A compressed-air drying system comprising:
   an air dryer comprising a desiccant, a supplying line, and an ejecting line, the air dryer configured to allow compressed air supplied from a compressor to pass through the desiccant, to trap water and oil contained in the compressed air, and to supply dried compressed air to the supplying line during a loading mode operation, and to regenerate the desiccant by ejecting purge air containing the trapped water and oil through the ejecting line during an unloading mode operation; and an oil separator, the oil separator connected to the ejecting line, comprising:
   a housing;
   an impingement member arranged in the housing; and
   a determination device that includes a sensor that measures a number of times the purge air is introduced into the housing, the sensor configured to determine whether the liquid stored in the liquid storage portion should be delivered to the external device, wherein the oil separator introduces the purge air ejected from the air dryer into the housing and causes the purge air to strike the impingement member to separate liquid containing the oil from the introduced purge air and stores the liquid in a liquid storage portion, wherein the oil separate is installed in a vehicle in which a diesel engine is mounted, wherein the liquid storage portion includes an ejection port that is connected to a combustion unit provided in an exhaust purification device that traps particles contained in exhaust gas of the diesel engine, wherein the liquid stored in the liquid storage portion is supplied to the combustion unit of the exhaust purification device, and wherein, when the measured number of times of introduction is greater than or equal to a number of times of introduction necessary for a predetermined amount of the liquid to be stored, the determination device determines that the liquid stored in the liquid storage portion should be delivered to the external device.

8. The compressed-air drying system according to claim 7, further comprising a heating device that heats the liquid stored in the liquid storage portion.

9. The compressed-air drying system according to claim 7, wherein the liquid is mixed with fuel for combustion and is supplied to the combustion unit.

\* \* \* \* \*